US 6,746,151 B2

(12) United States Patent
Le et al.

(10) Patent No.: US 6,746,151 B2
(45) Date of Patent: Jun. 8, 2004

(54) PARALLEL CAPILLARY SEAL FOR A DISK DRIVE

(75) Inventors: Lynn Bich-Quy Le, San Jose, CA (US); Chris Michael Woldemar, Santa Cruz, CA (US)

(73) Assignee: Seagate Technology LLC, Scotts Valley, CA (US)

(*) Notice: Subject to any disclaimer, the term of this patent is extended or adjusted under 35 U.S.C. 154(b) by 40 days.

(21) Appl. No.: 10/142,381

(22) Filed: May 8, 2002

(65) Prior Publication Data

US 2003/0133634 A1 Jul. 17, 2003

Related U.S. Application Data

(60) Provisional application No. 60/348,749, filed on Jan. 14, 2002.

(51) Int. Cl.[7] .............................................. F16C 33/72
(52) U.S. Cl. ........................ 384/107; 384/130; 384/132
(58) Field of Search ................................. 384/107, 110, 384/119, 124, 112, 113, 123, 130, 132; 360/99.08, 99.05

(56) References Cited

U.S. PATENT DOCUMENTS

| | | | | |
|---|---|---|---|---|
| 4,892,418 A | * | 1/1990 | Asada et al. | 384/124 |
| 5,246,294 A | * | 9/1993 | Pan | 384/119 |
| 5,427,456 A | * | 6/1995 | Hensel | 384/112 |
| 5,453,650 A | | 9/1995 | Hashimoto et al. | 310/268 |
| 5,504,637 A | | 4/1996 | Asada et al. | 360/98.07 |
| 5,533,811 A | * | 7/1996 | Polch et al. | 384/107 |
| 5,536,088 A | * | 7/1996 | Cheever et al. | 384/107 |
| 5,558,443 A | * | 9/1996 | Zang | 384/112 |
| 5,558,445 A | * | 9/1996 | Chen et al. | 384/132 |
| 5,876,124 A | * | 3/1999 | Zang et al. | 384/107 |
| 5,877,567 A | * | 3/1999 | Moritan | 310/67 R |
| 5,980,113 A | * | 11/1999 | Grantz | 384/108 |
| 6,019,516 A | * | 2/2000 | Leuthold et al. | 384/110 |
| 6,069,767 A | * | 5/2000 | Khan et al. | 360/99.08 |
| 6,126,320 A | * | 10/2000 | Ichiyama | 384/112 |
| 6,154,339 A | | 11/2000 | Grantz et al. | 360/99.08 |
| 6,176,618 B1 | * | 1/2001 | Kawawada et al. | 384/107 |
| 6,181,039 B1 | * | 1/2001 | Kennedy et al. | 310/90 |
| 6,271,612 B1 | * | 8/2001 | Tanaka et al. | 310/90 |
| 6,307,293 B1 | * | 10/2001 | Ichiyama | 310/90.5 |
| 6,322,252 B1 | * | 11/2001 | Grantz et al. | 384/124 |
| 6,371,650 B1 | * | 4/2002 | Goto et al. | 384/110 |
| 2001/0002939 A1 | | 6/2001 | Aizawa et al. | 384/477 |
| 2001/0005296 A1 | | 6/2001 | Sakuragi et al. | 360/99.08 |
| 2001/0053042 A1 | | 12/2001 | Lee et al. | 360/99.08 |

OTHER PUBLICATIONS

Intl Search Rept PCT/US 03/00406 Jan. 7, 2003.

* cited by examiner

*Primary Examiner*—David A. Bucci
*Assistant Examiner*—Julie Smith
(74) *Attorney, Agent, or Firm*—Moser Patterson & Sheridan

(57) ABSTRACT

A fluid dynamic bearing includes a shaft and a sleeve which are supported for relative rotation by fluid in the gap therebetween. A capillary seal at one end of the bearing prevents fluid from leaking out. The seal is defined between the hub and the sleeve, which are in relative rotation, and diverge from one another in the region where the capillary seal is established. The gap which is incorporated in the capillary seal is in airway communication with the gap between the shaft and the sleeve; but the capillary seal is defined by an outer surface of the sleeve and is substantially parallel to the gap between the shaft and the sleeve. The capillary seal is radially spaced from the region where one of two journal bearing groove sets is defined. The grooves sets may be located so that they are balanced about the center of gravity of the system.

20 Claims, 5 Drawing Sheets

PARALLEL CAPILLARY SEAL FOR A DISK DRIVE

CROSS REFERENCE TO A RELATED APPLICATION

This invention is based on provisional patent application No. 60/348,749 filed Jan. 14, 2002; the priority of this application is hereby claimed, and the provisional application is incorporated herein by reference.

FIELD OF THE INVENTION

The present invention relates to the field of fluid dynamic bearing assemblies, and more specifically to improved apparatus for sealing the improved fluid dynamic bearing from the outside atmosphere.

BACKGROUND OF THE INVENTION

Disc drive memory systems have been used in computers for many years for storage of digital information. Information is recorded on concentric memory tracks of a magnetic disc medium, the actual information being stored in the form of magnetic transitions within the medium. The discs themselves are rotatably mounted on a spindle, the information being accessed by means of transducers located on a pivoting arm which moves radially over the surface of the disc. The read/write heads or transducers must be accurately aligned with the storage tracks on the disc to ensure proper reading and writing of information; thus the discs must be rotationally stable.

During operation, the discs are rotated at very high speeds within an enclosed housing by means of an electric motor which is generally located inside the hub or below the discs. One type of motor in common use is known as a spindle motor. Such motors typically have a spindle mounted by means of two ball bearing systems to a motor shaft disposed in the hub. One of the bearings is typically located near the top of the spindle, and the other near the bottom. These bearings allow for rotational movement between the shaft and hub, while maintaining accurate alignment of the spindle to the shaft. The bearings themselves are normally lubricated by grease or oil.

The conventional bearing system described above, however, is prone to several shortcomings. First is the problem of vibration generated by the balls rolling on the raceways. Ball bearings used in hard disc drive spindles run under conditions that generally result in physical contact between raceway and ball, in spite of the lubrication layer provided by the bearing oil or raceway and ball, in spite of the lubrication layer, in spite of the lubrication layer provided by bearing oil or grease. Hence, bearing balls running on the generally smooth but microscopically uneven and rough raceways transmit this surface structure as well as their imperfections in sphericity in the form of vibration to the rotating disc. This vibration results in misalignment between the data tracks and the read/write transducer, limiting the data track density and the overall performance of the disc drive system.

Another problem is related to the application of hard disc drives in portable computer equipment and resulting requirements in shock resistance. Shocks create relative acceleration between the discs and the drive casting which in turn show up as a force across the bearing system. Since the contact surfaces in ball bearings are very small, the resulting contact pressures may exceed the yield strength of the bearing material, and leave long term deformation and damage to the raceway and the balls of the ball bearing.

Moreover, mechanical bearings are not easily scaleable to smaller dimensions. This is a significant drawback since the tendency in the disc drive industry has been to continually shrink the physical dimensions of the disc drive unit.

As an alternative to conventional ball bearing spindle systems, hydrodynamic bearings are being adopted. In these types of systems, lubricating fluid—either gas or liquid—functions as the actual bearing surface between a stationary base or housing and the rotating spindle or rotating hub of the motor. For example, liquid lubricants comprising oil, more complex ferro-magnetic fluids or even air have been utilized in hydrodynamic bearing systems. The reason for the popularity of the use of air is the importance of avoiding the outgassing of contaminants into the sealed area of the head/disc housing. However, air does not provide the lubricating qualities of oil. The relatively high viscosity of oil allows for larger bearing gaps and therefore greater tolerances to achieve similar dynamic performance.

An essential feature of such fluid dynamic bearings is to seal the bearing from the surrounding atmosphere, especially when the bearing or the motor in which the bearing is incorporated is to be used in a disc drive. In the most common form of hydrodynamic bearing, a shaft is provided, supported for relative rotation relative to a surrounding sleeve and for radial stiffness by a journal bearing. Such a bearing typically includes two sets of grooves defined on either the external surface of the shaft or the internal surface of the sleeve. Fluid in the gap between shaft and sleeve supports the relative rotation. Typically, a capillary seal is defined by a gradual divergence of one of the walls of the gap away from the other wall is used at an end of the journal bearing to prevent loss of any fluid. This seal design, located at an end of the journal bearing along the sleeve bore, is designed to prevent fluid leakage outwardly during operation, and also to prevent the intake of ambient air when the system operates at vacuum or under low internal pressure. However, the use of this design limits the journal bearing span from being enlarged; and when the shaft is shortened for a small form factor bearing or motor design, it makes balancing the bearing more difficult.

Therefore, an alternative design which allows for enlargement of the journal bearing span, as well as balancing the bearings closer about the center of the rotating shaft or closer to the overall center of gravity of the design is highly desirable.

SUMMARY OF THE INVENTION

The present invention is intended to provide advantages over and solve many of the problems of the prior art.

In one embodiment, the invention allows more room for the journal bearing to be extended along the bore between the shaft and the sleeve.

The present invention further is intended to increase bearing stiffness, by allowing for extension of the journal bearing along the shaft and the sleeve.

The present invention further has the objective of allowing modified placement of the journal bearing grooves along the shaft and sleeve to allow improved balancing of the bearing locations relative to the center of gravity of the motor and/or disc drive in which the bearing is included, as well as improved balance of the bearing system in which the seal is included.

These and other objectives and advantages are achieved in an unvented design comprising a fluid dynamic bearing including a shaft rotating within a sleeve. The shaft and sleeve are supported for relative rotation by fluid in the gap between the shaft and sleeve. To prevent fluid from leaking out of the fluid dynamic bearing into the surrounding atmosphere, one end of the fluid is defined by a capillary seal.

According to the present invention, rather than have the capillary seal defined between the shaft and sleeve, the seal is defined between the hub which rotates to establish rotation of the discs, and a facing surface of the sleeve. The surface of the hub and surface of the sleeve are in relative rotation, and diverge from one another in the region where the capillary seal is to be established. The gap which is incorporated in the capillary seal is in airway communication with the gap between the shaft and the sleeve. But the capillary seal is now defined by a radially outer surface of the sleeve and is substantially parallel to the gap between the shaft and the sleeve.

In a preferred embodiment, the capillary seal is substantially parallel to but radially spaced from the region where one of the dual journal bearing groove sets is defined.

In a further preferable approach, the grooves on the sleeve that define the dual journal bearings are located so that they are distributed as well as possible on either side of the center of gravity of the system in which the journal bearing and capillary seal combination is located. Other features and advantages of the invention will be apparent to a person of skill in this field who studies the description of the following preferred embodiment given with respect to the following drawings.

DETAILED DESCRIPTION OF THE PREFERRED EMBODIMENT

The description to follow of a preferred embodiment or embodiments of the present invention teaches a highly efficient apparatus and method for sealing the counterplate without the need for welding in a hydrodynamic bearing motor. The technique is especially useful in thrust plate design hydrodynamic bearings incorporated in spindle motors for use in a disc drive, as the loss of fluid from the dynamic bearing or any outgassing from materials to use to seal the dynamic bearing is especially undesirable in such an environment. However, the present invention has many other uses than in motors for hard disc drives, and is not intended to be limited to uses in such environment. The invention has other uses, because the preservation of the fluid level in a fluid dynamic bearing is always a critical feature to provide long life for the fluid dynamic bearing. However, it is especially useful in hard disc drives because of the importance of not having any fluid leak out of the bearing or motor or expelled from the bearing over the entire life of the bearing, as contamination of the atmosphere within the hard disc drive by droplets are outgassing is especially undesirable.

Figure 1:
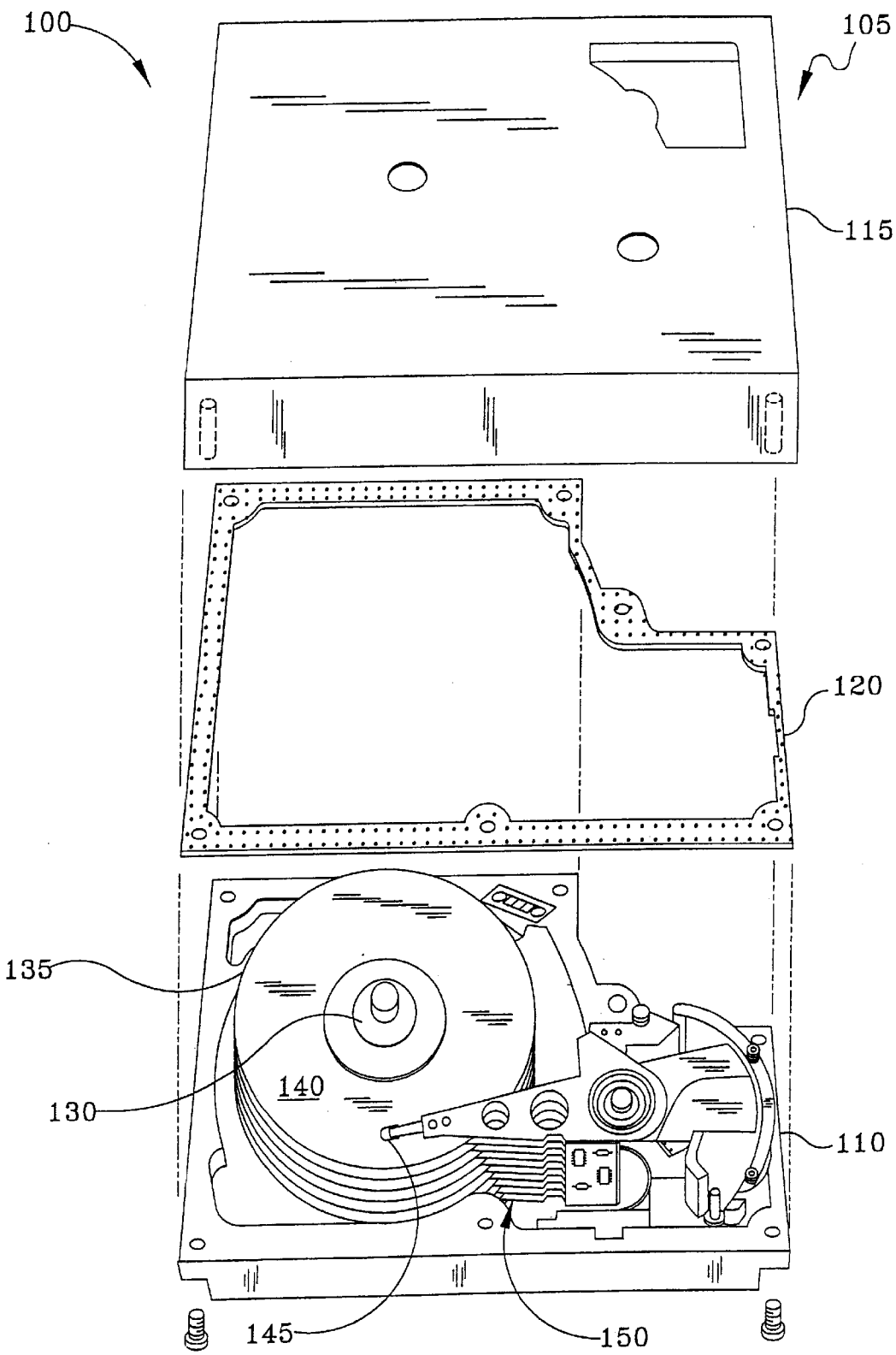
FIG. 1 is an exploded perspective view of a disc drive in which a motor incorporating the present seal design is useful.

The basic principles of the invention will be explained with respect to a hydrodynamic bearing used in a spindle motor such as is used in the disc drive shown in the exploded view of FIG. 1, the spindle motor itself being shown in the vertical sectional view of FIG. 2. FIG. 1 shows a disc drive 100 including a base 110, a cover 115, and a sealing ring 120 which may be used to seal the two together to provide a sealed environment for the disc drive.

A spindle motor generally indicated at 130 and to be described in detail below includes a hub which supports one or more discs 140 for rotation at constant speed. Each of these discs has one or both surfaces comprising a plurality of tracks on which data is stored. An actuator generally indicated at 150 supports a plurality of actuator arms, each having a transducer at an end thereof which is associated with the disc storage surface. As the disc rotates, the transducer flies on a thin cushion of air over the surface of the disc and reads and writes data to and from tracks on the disc. It is essential to the long lived operation of the motor which must rotate at high speed and at constant speed for hours at a time and maintain that on a daily basis for years at a time that the fluid be maintained in the gaps which define the hydrodynamic bearings and which in turn support the hub, and the discs it carries for rotation. Thus it is essential that some apparatus and method be adopted for sealing the fluid dynamic bearing from the outside atmosphere. This prevents contamination of that atmosphere and loss of the fluid which is so essential to the long life of the hydrodynamic bearings.

Figure 2:
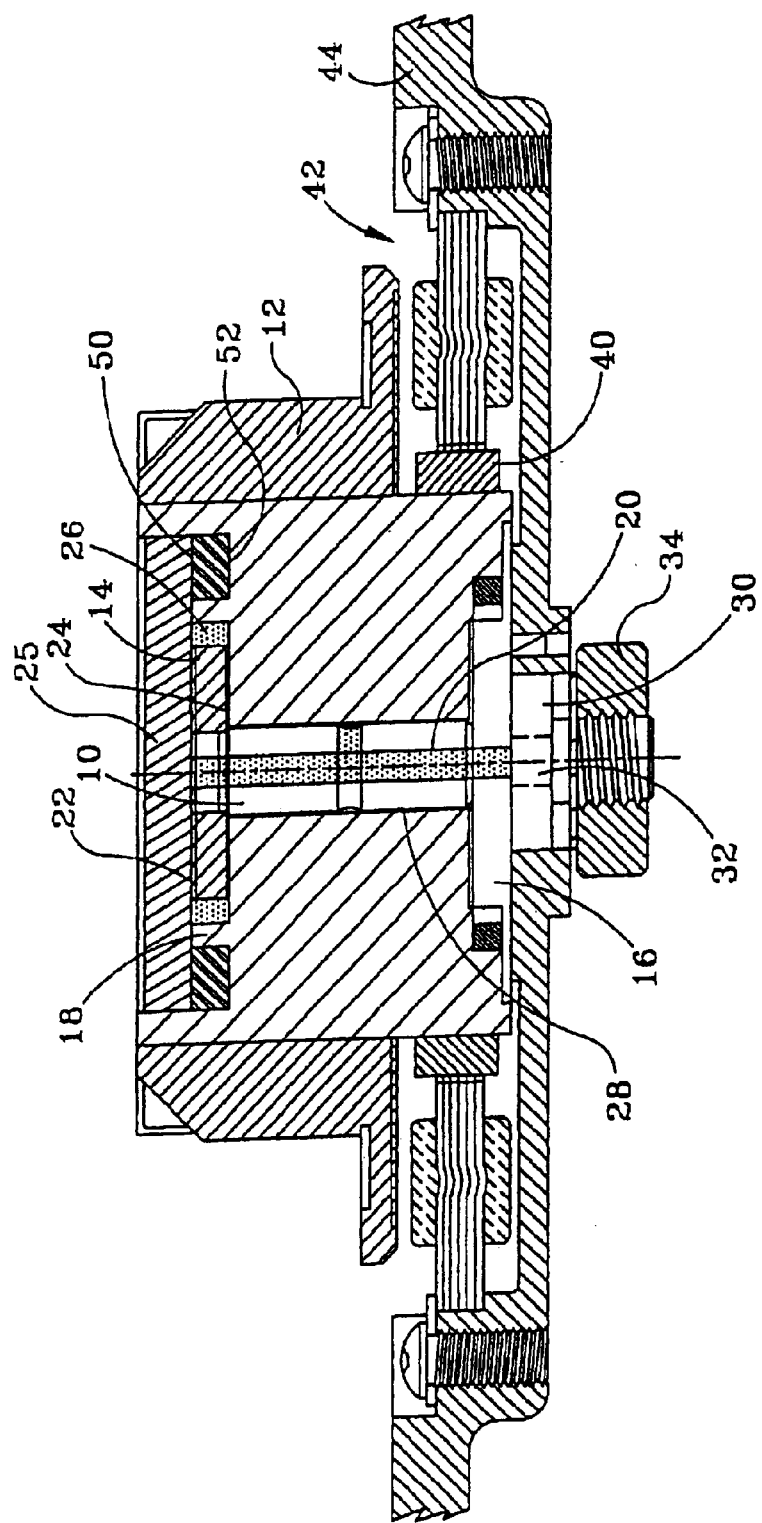
FIG. 2 is a vertical section of a motor incorporating the journal bearing and seal as known in the prior art.

Considering the spindle motor with a fluid dynamic bearing shown in FIG. 2, the figure shows a shaft 10 supported from the base 44 by a shoulder 16. The shaft is shown mounted into an extension of the base 34 by a threaded extension 32 to hold it stable. The shaft includes, on a distal end from the base, a thrust plate 14. This thrust plate 14 has thrust bearings 22 and 24 on either axial surface thereof, defined by grooves on either the surface of the thrust plate or the facing surface of the sleeve 18 or counterplate 25. Fluid in the gap between these thrust plate surfaces supports the thrust plate for rotation. The fluid is also found in the gap 26 facing the radial end of the thrust plate 14. Further, a journal bearing is found along the surface, defined between the outer surface of the shaft 10 and the inner surface of the sleeve 18. In this particular embodiment, fluid is also maintained in a reservoir channel 20 in the center of the shaft 10, although this feature is of no particular structural significance to this invention. The fact is that fluid must be maintained over the surface of the journal bearing defined by gap 28, and the thrust bearing defined by gaps 22 and 24. Therefore the gap must be sealed against fluid loss.

Figure 3A:
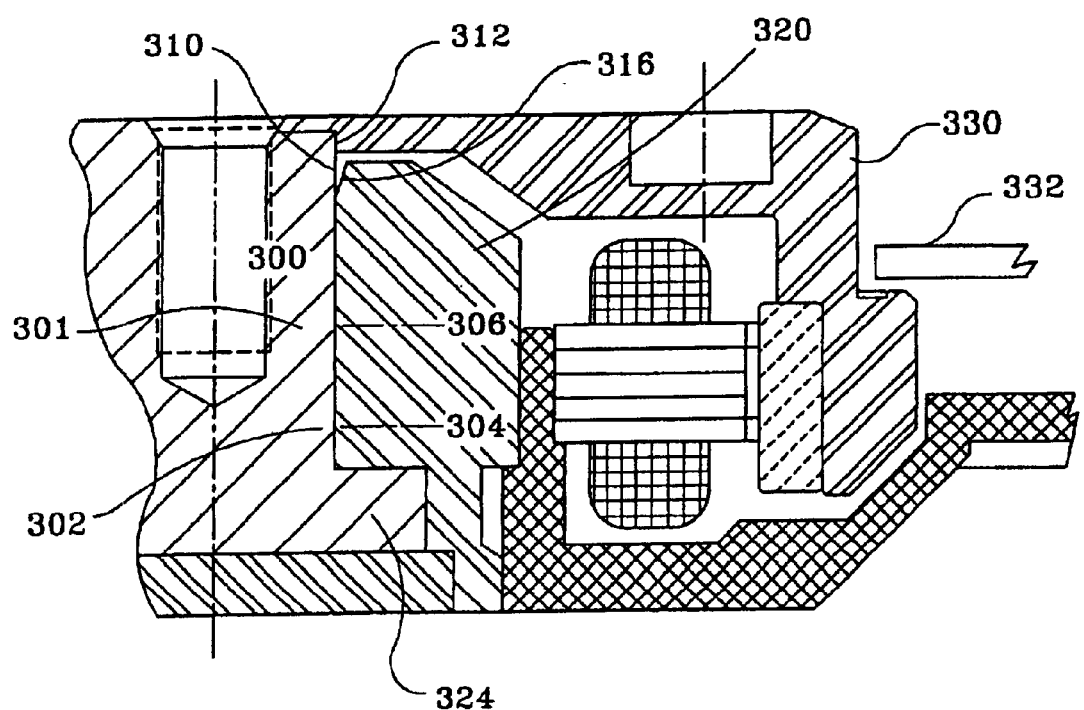
FIG. 3A is a detailed vertical section of a portion of the motor illustrated in FIG. 2.
Figure 3B:
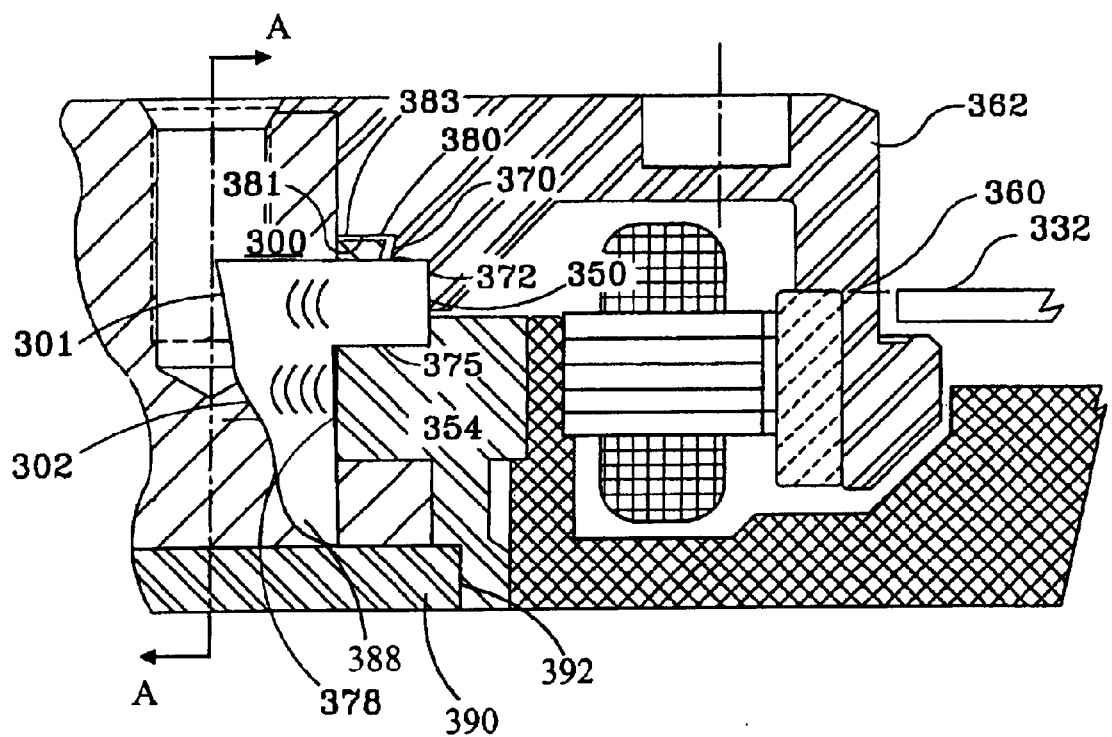
FIG. 3B is a vertical section of a portion of a motor incorporating the present invention.

The significance of the change proposed by this invention can be readily appreciated by comparison of FIGS. 3A and 3B.

FIG. 3A shows in greater detail a section of a motor bearing of the type shown in FIG. 2 and in common use in the field of hydrodynamic bearings. The key feature FIG. 3A shows dual journal bearings 300, 302 whose locations are marked by their respective center lines, 304, 306. As discussed above, the width available for the groove patterns which form these journal bearings is limited by the required presence of the capillary seal 310 formed by the outer 312 wall of the shaft 300 and the inner wall of the 316 of the sleeve 320. This particular figure also clearly shows the thrust plate 324 at the end of the shaft 300 which combine to support the hub 330 for rotation. The hub 330 will support one or more discs 332 for rotation in the disc drive as described above with respect to FIG. 2. It is readily apparent that most of the journal bearing 301, 302 is below the center of gravity of the hub 330 and discs 32 which must be supported for stable rotation, thereby making this stable rotation difficult to achieve and maintain in low profile motors with a short shaft.

The advantages of the design of FIG. 3B are apparent by comparison to to design of FIG. 3A. FIG. 3B illustrates a motor similar to the motor illustrated in 3A; the motor in FIG. 3B comprises a shaft 300 supporting a hub 362 on one end and a thrust plate 388 on an opposite end. A counter plate 390 is further supported on the shaft, adjacent to the thrust plate 388, and is separated from the sleeve 354 by a small gap 392. In FIG. 3B, the reservoir/capillary seal 350 is in a position on an axis parallel to the axis of rotation A–A' of the shaft but radially spaced from the shaft 300. The dual journal bearings 301, 302 comprise groove patterns that may be defined on either surface of the sleeve of the shaft 300 or the inner surface of the sleeve 354. It is apparent from an examination of this figure that these bearings 301, 302 are now axially lengthened, and also maybe repositioned or lengthened to occupy a longer section of the shaft within the sleeve 354 and extending further toward the hub 330. Further, the upper bearing 301 and lower bearing 302 are positioned higher on the shaft relative to the likely center of gravity marked generally by the line 360. In one embodiment, the capillary seal 350 is positioned radially outward from the shaft 300 and is substantially parallel thereto, but is located axially inward of the ends of the shaft (e.g., "between" the ends or closer to a center of the shaft, as illustrated in FIG. 3B). Therefore, the stable rotation of the hub 362 and the disc 332 are much more easily and reliably achieved.

The sealing reservoir or capillary seal 350 comprises a generally axially oriented surface 370 of the hub 362 facing a generally axially oriented surface 372 of sleeve 354. In this example, the sleeve 370 is oriented at a small angle relative to the surface 370 which is generally parallel to the axis of the shaft 300. This divergence causes the formation of a meniscus 375 which defines or establishes the end of the fluid filling the gap 378 between the shaft 300 and the sleeve 354. This reservoir or capillary 350 is connected to the journal bearing gap by an air gap 380 which extends from the fluid filled gap 378 between shaft 300 and sleeve 354, the gap 380 extending between a radially oriented surface 381 and a parallel surface of the sleeve 354 and a similar surface 383 of the hub 362. Thus the sealing reservoir 350 defined by the capillary and ending in the meniscus 375 is in fluid communication with the gap 378 that supports rotation of the shaft to carry rotation of the hub; but this sealing reservoir does not occupy any of the vertical space along the shaft 300, thereby allowing this axial length of the shaft to be used for the journal bearing 301, 302 which must support the shaft and hub for rotation. Thus it is apparent from the review of this figure that the journal bearing is extended in length making it more effective in providing radial stiffness for the system; further the two sets of bearing grooves are better located relative to the center of gravity of the rotating hub and disc, further stabilizing the rotating system.

Figure 4:
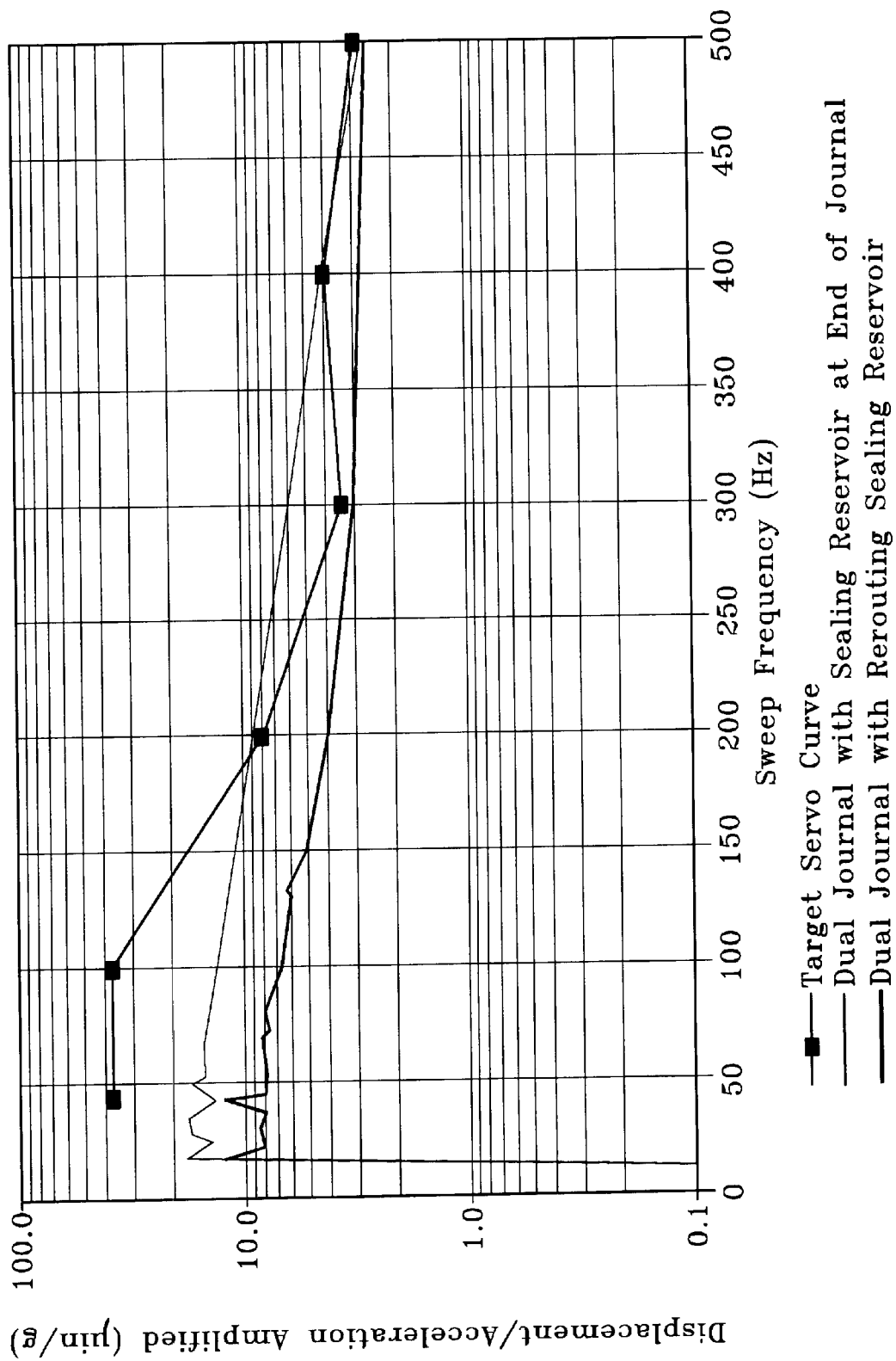
FIG. 4 is a graph showing the projected operational vibration performance incorporating the seal of the present invention as compared to the operational vibration performance of a similar design utilizing the seal located according to the prior art along the shaft and sleeve.

In fact, preferably the capillary seal is roughly radially adjacent one set of journal bearing grooves, allowing achievement of a relatively low profile motor. FIG. 4 is a figure which illustrates the improved operating vibration performance achieved by the present invention. The graph herein is a comparison of simulated results for the embodiment shown in FIGS. 3A and 3B. As marked, the desired or target operational performance is shown by the line 400. The embodiment of FIG. 3A, as simulated, and including a capillary seal at the end of the shaft and sleeve and therefore axially adjacent the journal bearings, is shown by the line 402. It is readily apparent that as simulated, this design violates the target specification for a substantial portion of its operating frequency, shown between frequencies of approximately 200 to 400 Hz.

In contrast, the modified design of FIG. 3B has a operating vibration characteristic shown by the line 404 which does not violate the target specification limitation throughout the operating region of significance. This improved operation is achieved by the relocation of the sealing reservoir or capillary to a location parallel to the shaft but radially displaced from the shaft so that more room is allowed for bearing span along the shaft sleeve bore.

Other embodiments of this invention may be apparent to a person of skill in the art who studies this disclosure. Although the FIGS. 3A and 3B show a rotating shaft design, designs incorporating a fixed shaft could also benefit from adopting principles of this invention. Therefore, the scope of the present invention is to be limited only by the following claims.

What is claimed is:

1. A fluid dynamic bearing comprising a shaft and a thrust plate supported on a first end thereof, a sleeve defining a bore surrounding the shaft, a first gap between the shaft and the sleeve having fluid therein to support the shaft and sleeve, grooves being defined on one of the external surface of the shaft and the internal surface of the sleeve to establish a journal bearing, a hub supported upon a second end of the shaft for rotation with the shaft, and a capillary seal defined between a surface of the hub and a surface of the sleeve and connected by a second gap to the first gap between the outer surface of the shaft and the inner surface of the sleeve, the capillary seal being spaced radially outward from a onion of the shaft located axially inward of the first and second ends so that the length and location of the journal bearing on the shaft and sleeve maybe optimized.

2. A fluid dynamic bearing as claimed in claim 1 wherein the first gap and second gap are in fluid communication so that a continuous gap is established between supporting the thrust plate and sleeve for rotation, and the capillary seal is in the second gap.

3. A fluid dynamic bearing as claimed in claim 2 wherein the capillary seal has an axis which is parallel to a primary axis of rotation of the shaft and thrust plate.

4. A fluid dynamic bearing as claimed in claim 2 wherein the journal bearing comprises first and second sets of the grooves axially spaced from each other along the gap between the shaft and the sleeve.

5. A fluid dynamic bearing as claimed in claim 2 wherein the first and second sets of grooves are located relative to the center of gravity of the rotating hub so that the vibration of the hub is minimized.

6. A fluid dynamic bearing as claimed in claim 3 wherein the shaft is a rotating shaft and hub is coupled to rotate with the shaft.

7. A fluid dynamic boating as claimed in claim 3 wherein the bearing further comprises the thrust plate at an end of the shaft distal from the hub, the bearing further comprising a counterplate supported in the sleeve and defining a third gap between a surface of the thrust plate and a surface of the counterplate, fluid in the second gap supporting the thrust plate for rotation relative to the sleeve and counterplate.

8. A fluid dynamic bearing as claimed in claim 3 wherein the capillary seal is defined by an inward facing surface of the hub and an outward facing surface of the sleeve.

9. A fluid dynamic bearing as claimed in claim 8 wherein the outward facing surface of the sleeve is substantially parallel to the axis of the shaft, and the inward facing surface of the hub is at an angle to outward facing surface of the sleeve.

10. In a spindle motor for use in a disc drive comprising a shaft supported from a base and a hub supported on a first end of the shaft for rotating with the shaft, the hub supporting one or more discs for rotation, A fluid dynamic bearing comprising the shaft and a thrust plate supported on a second end thereof, a sleeve supporting the hub and defining a bore surrounding the shaft, a first gap between the shaft and the sleeve having fluid therein to support the shaft and sleeve for grooves being defined on one of the external surface of the shaft and the internal surface of the sleeve to establish a journal bearing, and a capillary seal defined between a surface of the hub and a surface of the alcove and connected by a second gap to the first gap between the outer surface of the shaft and the inner surface of the sleeve, the capillary seal being spaced radially outward from a portion of the shaft located axially inward of the first and second ends so that the length and location of the journal bearing on the shaft and sleeve may be optimized.

11. A motor as claimed in claim 10 wherein the first gap and second gap are in fluid communication so that a continuous gap is established between supporting the thrust plate and sleeve for rotation, and the capillary seal is in the second gap.

12. A motor as claimed in claim 11 wherein the capillary seal has an axis which is parallel to a primary axis of rotation of the shaft and thrust plate.

13. A motor as claimed in claim 12 wherein the capillary seal is defined by an inward facing surface of the hub and an outward facing surface of the sleeve.

14. A motor as claimed in claim 13 wherein the outward facing surface of the sleeve is substantially parallel to the axis of the shaft, and the inward facing surface of the hub is at an angle to outward facing surface of the sleeve.

15. A motor as claimed in claim 11 wherein the journal bearing comprises first and second sets of the groves axially spaced from each other along the gap between the shaft and sleeve.

16. A motor as claimed in claim 11 wherein the first and second sets of grooves are located relative, to the center of gravity of the rotating hub so that the vibration of the hub is minimized.

17. A motor as claimed in claim 12 wherein the shaft is a rotating shaft and hub is coupled to rotate with the shaft.

18. A fluid dynamic bearing comprising a shaft and a thrust plate supported on first end thereof, a sleeve defining a bore surrounding the shaft, a first gap between the shaft and the sleeve having fluid therein to support the shaft and sleeve for rotation of the shaft relative to the sleeve, grooves being defined on one of the external surface of the abaft and the internal surface of the sleeve to establish a journal bearing, a hub supported on a second end of the shaft for rotation with the shaft, and means connected to the first gap and parallel to the first gap for maintaining fluid in the gap, said means being spaced radially outward from a portion of the shaft located axially inward of the first and second ends.

19. A fluid dynamic bearing as claimed in claim 18 wherein the journal bearing comprises first and second sets of the grooves axially spaced from each other and substantially balanced about said center of gravity of the hub along the gap between die shaft and the sleeve.

20. A bearing as claimed in claim 19 wherein the means connected to the first gap comprises a capillary seal defined between a surface of the hub and a surface of the sleeve and connected by a second gap to the first gap between the outer surface of the shaft and the inner surface of the sleeve so that the length and location of the journal bearing on the shaft and sleeve may be optimized.

* * * * *